US012674482B2

(12) United States Patent (10) Patent No.: US 12,674,482 B2
Xiao et al. (45) Date of Patent: Jul. 7, 2026

(54) FAST AND SIMPLE EXPANSION BOLT

(71) Applicant: Jiangsu Sunwell Cabinetry Co., Ltd.,
Yixing (CN)

(72) Inventors: Jianyun Xiao, Yixing (CN); **Jianwei
Weng, Yixing (CN); Jianmin Qi**,
Yixing (CN)

(73) Assignee: Jiangsu Sunwell Cabinetry Co., Ltd.,
Yixing (CN)

( * ) Notice: Subject to any disclaimer, the term of this
patent is extended or adjusted under 35
U.S.C. 154(b) by 379 days.

(21) Appl. No.: 18/403,029

(22) Filed: Jan. 3, 2024

(65) Prior Publication Data

US 2024/0229846 A1 Jul. 11, 2024

(30) Foreign Application Priority Data

Jan. 9, 2023 (CN) .......................... 202320043702.2

(51) Int. Cl.
F16B 13/06 (2006.01)
F16B 19/10 (2006.01)
(52) U.S. Cl.
CPC .......... F16B 13/066 (2013.01); F16B 19/109
(2013.01)
(58) Field of Classification Search
CPC ... F16B 13/066; F16B 19/1045; F16B 19/109
USPC .......................................... 411/57.1, 60.1, 72
See application file for complete search history.

(56) References Cited

U.S. PATENT DOCUMENTS

| | | | | |
|---|---|---|---|---|
| 5,531,551 A | * | 7/1996 | Bowers ............... | F16B 19/1045 |
| | | | | 24/607 |
| 5,611,637 A | * | 3/1997 | Brustle .................. | A47B 95/00 |
| | | | | 312/348.4 |
| 5,895,103 A | * | 4/1999 | Huber .................... | A47B 88/95 |
| | | | | 312/348.4 |
| 6,106,185 A | * | 8/2000 | Isele ...................... | A47B 88/43 |
| | | | | 403/409.1 |
| 6,200,081 B1 | * | 3/2001 | Ferrari .................. | E05D 5/0276 |
| | | | | 411/80 |
| 6,361,241 B1 | * | 3/2002 | Ferrari ..................... | E05D 5/08 |
| | | | | 403/279 |
| 8,342,787 B2 | * | 1/2013 | Smith ..................... | F16B 35/02 |
| | | | | 411/383 |
| 9,115,744 B1 | * | 8/2015 | Bulow ................ | F16B 19/1036 |
| 9,303,674 B2 | * | 4/2016 | Demmeler .............. | F16B 21/18 |
| 2005/0196249 A1 | * | 9/2005 | Huang .................. | E05D 5/0276 |
| | | | | 411/60.1 |
| 2014/0056668 A1 | * | 2/2014 | Demmeler ............ | F16B 19/109 |
| | | | | 411/353 |

* cited by examiner

*Primary Examiner* — Nicholas L Foster

(74) *Attorney, Agent, or Firm* — Birchwood IP

(57) ABSTRACT

The present disclosure discloses a fast and simple expansion
bolt, including an expansion bolt main body, an expansion
bolt locating line formed in an outer wall of a front end of
the expansion bolt main body; a locating slot formed in the
expansion bolt locating line; a rubber ring located on an
outer wall of the expansion bolt main body; a tail seat and
a locating ring located and mounted at a rear end of the
expansion bolt main body; a pressing seat located in the tail
seat; a locating column located on the pressing seat; a
pressing handle movably arranged on the locating column;
an adjustment pin arranged between the pressing handle and
the locating column; and the expansion bolt main body is
integrally formed with the expansion bolt locating line, the
locating slot, the locating ring, and the tail seat through
casting.

10 Claims, 10 Drawing Sheets

FAST AND SIMPLE EXPANSION BOLT

CROSS-REFERENCE TO RELATED APPLICATIONS

This application claims priority to Chinese Patent Application No. 202320043702.2, filed on Jan. 9, 2023, which is hereby incorporated by reference in its entirety.

TECHNICAL FIELD

The present disclosure relates to the field of locating bolts, and in particular, to a fast and simple expansion bolt.

BACKGROUND

A fast and simple expansion bolt is a supporting structure for quick locating. When two groups of objects are connected, bolts will be often used for locating. There are more and more types of bolts for use. With the continuous development of scientific technology, people have higher and higher requirements for expansion bolts.

The existing expansion bolts have certain drawbacks when used. Firstly, the existing expansion bolts are often disposable and difficult to disassemble during use. Tools are required during mounting of the existing expansion bolts, which is slow and not conducive to use. In addition, the use intensity of the expansion bolts cannot meet the requirements well, which has brought certain adverse effects to the use process. Therefore, a fast and simple expansion bolt is provided.

SUMMARY

(I) Technical Problem to be Solved

For the shortcomings in the prior art, the present disclosure provides a fast and simple expansion bolt. A corresponding hole is punched in advance in an object or a workpiece needing to be fixed, and the fast and simple expansion bolt is inserted into the hole; a handle is laterally pressed in place to achieve the purpose of fast fixation with bare hands; the working efficiency is improved; the fast and simple expansion bolt can be removed quickly and can be repeatedly used, so that the cost is reduced; and the problem in the background section is effectively solved.

(II) Technical Solution

In order to achieve the above objective, a technical solution adopted by the present disclosure is as follows: A fast and simple expansion bolt includes an expansion bolt main body, wherein an expansion bolt locating line is formed in an outer wall of a front end of the expansion bolt main body; a locating slot is formed in the expansion bolt locating line; a rubber ring is located on an outer wall of the expansion bolt main body; a tail seat and a locating ring are located and mounted at a rear end of the expansion bolt main body; a pressing seat is located inside the tail seat; a locating column is located on the pressing seat; a pressing handle is movably arranged on the locating column; and an adjustment pin is arranged between the pressing handle and the locating column.

Preferably, the expansion bolt main body is internally provided with a wear plate, an anticorrosion sheet, an antirust sheet, and a metal fiber sheet; the antirust sheet is located on a surface of the metal fiber sheet; the anticorrosion sheet is located on a surface of the antirust sheet; and the wear plate is located on a surface of the anticorrosion sheet.

Preferably, the expansion bolt main body is integrally formed with the expansion bolt locating line, the locating slot, the locating ring, and the tail seat through casting.

Preferably, the pressing handle and the locating column move with each other through the adjustment pin; and the pressing handle drives the expansion bolt main body to be pressed downwards and located.

Preferably, the expansion bolt main body and the rubber ring are sealed and located through glue.

Preferably, the wear plate, the anticorrosion sheet, the antirust sheet, and the metal fiber sheet are integrally formed through casting.

Preferably, the expansion bolt main body is cylindrical; the expansion bolt locating line is formed by forming at least two annular slots on an outer wall of a front part of the expansion bolt main body; and radial depths of the annular slots gradually increase from back to front.

Preferably, an expansion sliding hole running through from front to back is formed in the middle of the expansion bolt main body and the middle of the pressing seat; the locating column is mounted in the expansion sliding hole in a manner of sliding from front to back; and a truncated cone-shaped expansion head with a diameter gradually increasing from back to front is arranged at a front end of the locating column.

Preferably, the locating slot is an elongated notch arranged in a front-back direction of the expansion bolt main body and having an opening in a front end; and the locating slot is communicated to the expansion sliding hole and an outer side of the expansion bolt main body n a radial direction of the expansion bolt main body.

Preferably, the tail seat is in a truncated cone shape having a diameter gradually decreasing from back to front. A minimum diameter of the tail seat is not less than a diameter of the expansion bolt main body, and the tail seat is coaxially connected to the expansion bolt main body.

Preferably, the pressing handle is hinged with the locating column via the adjustment pin; and a pressing cam cooperating with the pressing seat is arranged on the pressing handle at the adjustment pin. The pressing handle can be pulled to drive the pressing cam to rotate around the adjustment pin. When a small-diameter part of the pressing cam is in contact with the pressing seat, the expansion head is located on a front side of the expansion bolt main body. When a large-diameter part of the pressing cam is in contact with the pressing seat, the locating column is pulled back until the expansion head enters a front end portion of the expansion bolt main body, and the front end portion of the expansion bolt main body expands outwards.

Preferably, when the expansion head enters the front end portion of the expansion bolt main body and the front end portion of the expansion bolt main body expands outwards, the large-diameter part of the pressing cam and the pressing handle are respectively located on a left side and a right side of the adjustment pin. This can prevent the adjustment pin from exerting a forward tension on the pressing cam, causing the pressing cam to rotate anticlockwise. The pressing cam is a disk-shaped cam.

(III) Beneficial Effects

Compared with the prior art, the present disclosure provides the fast and simple expansion bolt, which has the following beneficial effects: According to the fast and simple expansion bolt, corresponding hole is punched in advance in an object or a workpiece needing to be fixed, and the fast and simple expansion bolt is inserted into the hole; the handle is laterally pressed in place to achieve the purpose of fast fixation with bare hands; the working efficiency is improved; and the fast and simple expansion bolt can be removed quickly and can be repeatedly used, so that the cost is reduced. The whole fast and simple expansion bolt has a simple structure and is convenient to operate, and a usage effect is better than that of a traditional method.

Figure 1:
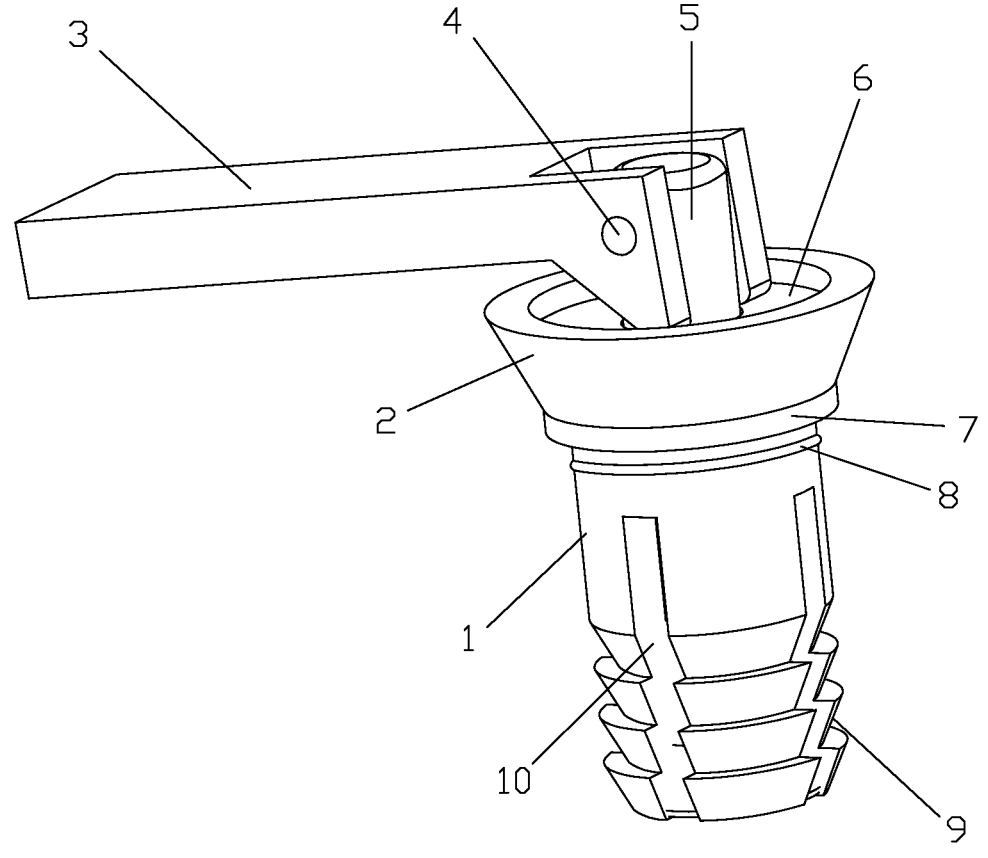
FIG. 1 is a schematic diagram of an entire structure of a fast and simple expansion bolt according to the present disclosure.
Figure 2:
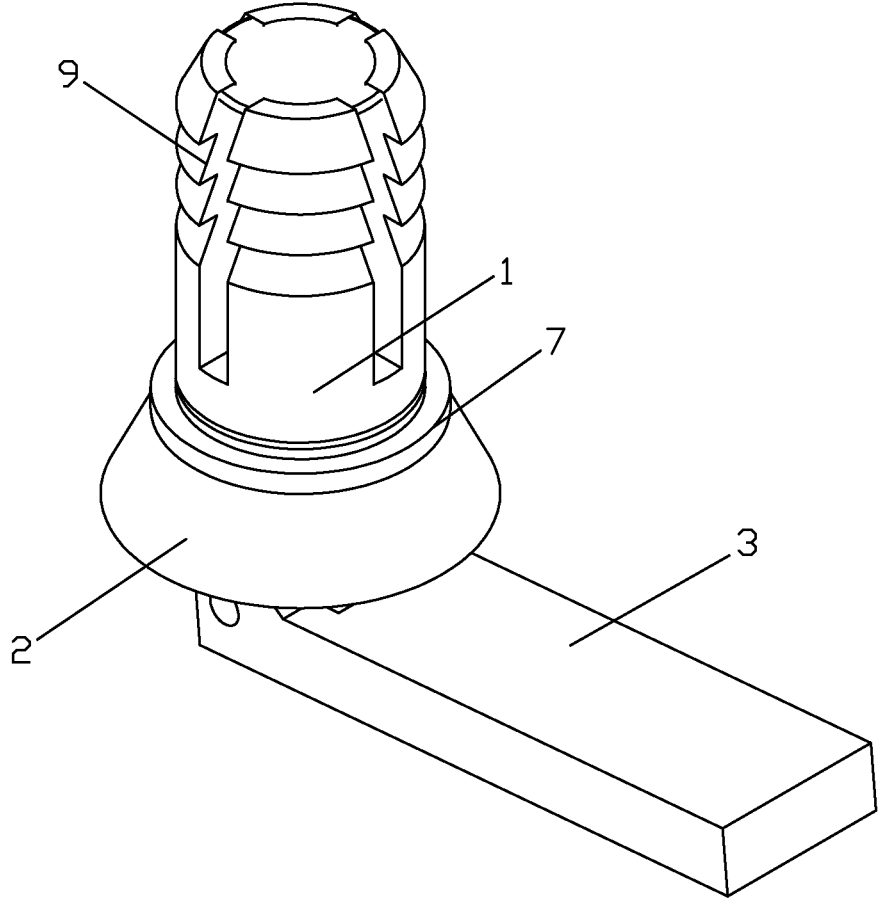
FIG. 2 is a schematic structural diagram of an entire bottom of a fast and simple expansion bolt according to the present disclosure.
Figure 3:
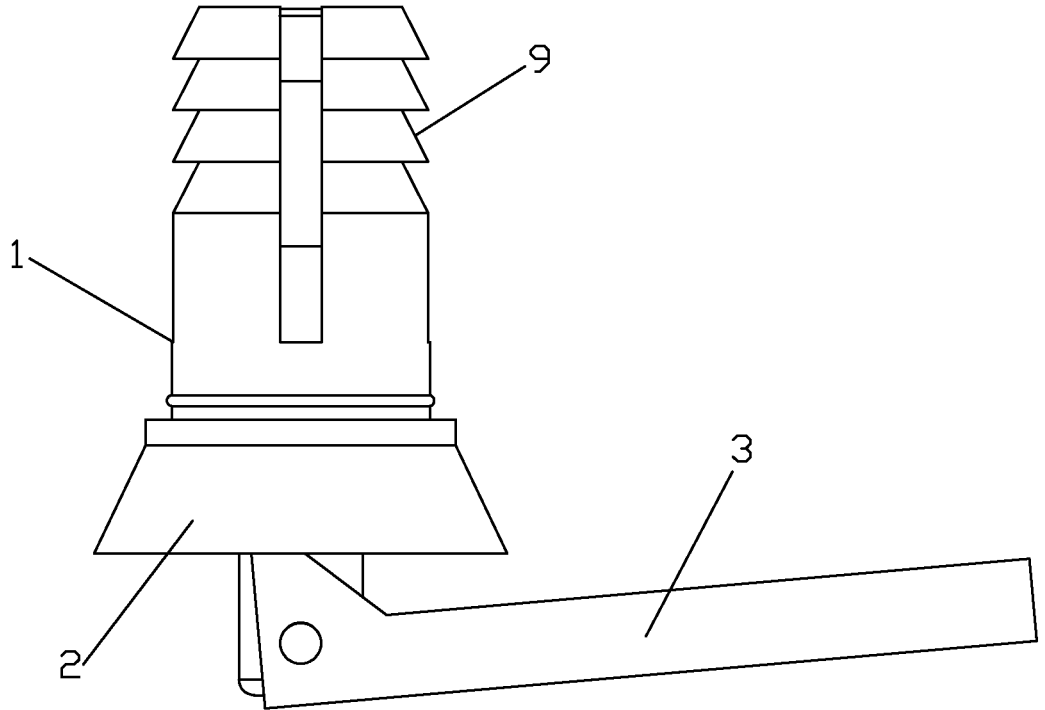
FIG. 3 is a schematic structural diagram of a front view of a fast and simple expansion bolt according to the present disclosure.
Figure 4:
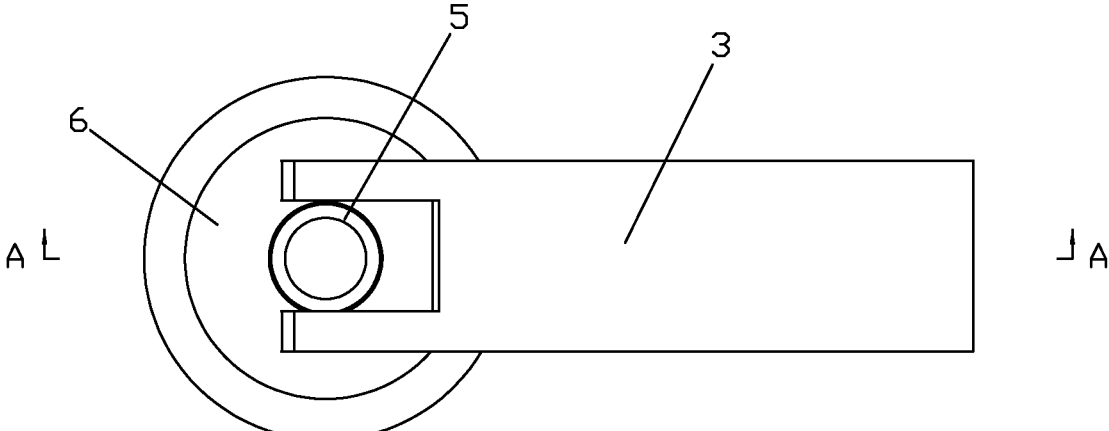
FIG. 4 is a schematic structural diagram of a top view of a fast and simple expansion bolt according to the present disclosure.

In the drawings: 1: expansion bolt main body; 2: tail seat; 3: pressing handle; 4: adjustment pin; 5: locating column; 6: pressing seat; 7: locating ring; 8: rubber ring; 9: expansion bolt locating line; 10: locating slot; 11: wear plate; 12: anticorrosion sheet; 13: antirust sheet; 14: metal fiber sheet; 15: expansion head; 16: pressing cam; 17: large-diameter part of pressing cam; and 18: small-diameter part of pressing cam.

DESCRIPTION OF EMBODIMENTS

As shown in FIG. 1 to FIG. 4, a fast and simple expansion bolt includes an expansion bolt main body 1, wherein an expansion bolt locating line 9 is formed in an outer wall of a front end of the expansion bolt main body 1; a locating slot 10 is formed in the expansion bolt locating line 9; a rubber ring 8 is located on an outer wall of the expansion bolt main body 1; a tail seat 2 and a locating ring 7 are located and mounted at a rear end of the expansion bolt main body 1; a pressing seat 6 is located inside the tail seat 2; a locating column 5 is located on the pressing seat 6; a pressing handle 3 is movably arranged on the locating column 5; and an adjustment pin 4 is arranged between the pressing handle 3 and the locating column 5. A corresponding hole is punched in advance in an object or a workpiece needing to be fixed, and the fast and simple expansion bolt is inserted into the hole; the handle is laterally pressed in place to achieve the purpose of fast fixation with bare hands; the working efficiency is improved; and the fast and simple expansion bolt can be removed quickly and can be repeatedly used, so that the cost is reduced.

Figure 5:
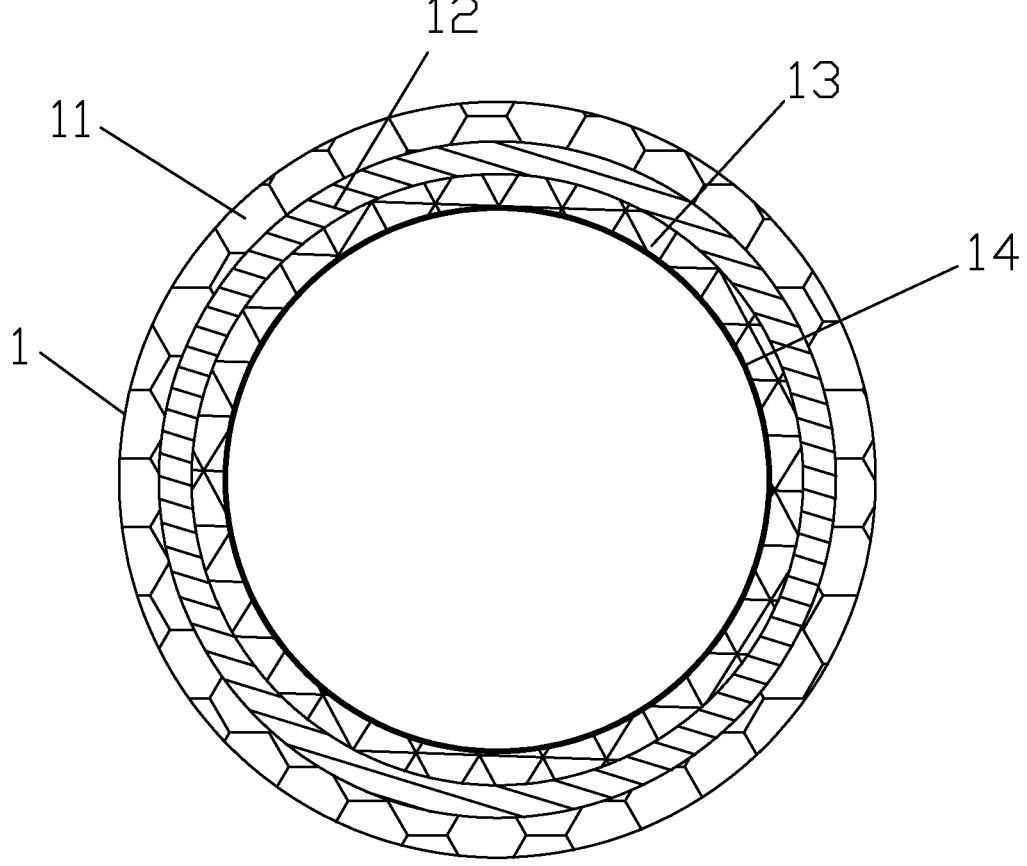
FIG. 5 is a schematic structural diagram of an internal cross-sectional view of an expansion bolt main body of a fast and simple expansion bolt according to the present disclosure.

Further, as shown in FIG. 5, the expansion bolt main body 1 is internally provided with a wear plate 11, an anticorrosion sheet 12, an antirust sheet 13, and a metal fiber sheet 14; the antirust sheet 13 is located on a surface of the metal fiber sheet 14; the anticorrosion sheet 12 is located on a surface of the antirust sheet 13; and the wear plate 11 is located on a surface of the anticorrosion sheet 12.

Further, the expansion bolt main body 1 is integrally formed with the expansion bolt locating line 9, the locating slot 10, the locating ring 7, and the tail seat 2 through casting.

Further, the pressing handle 3 and the locating column 5 move with each other through the adjustment pin 4; and the pressing handle 3 drives the expansion bolt main body 1 to be pressed downwards and located.

Further, the expansion bolt main body 1 and the rubber ring 8 are sealed and located through glue.

Further, the wear plate 11, the anticorrosion sheet 12, the antirust sheet 13, and the metal fiber sheet 14 are integrally formed through casting.

Preferably, as shown in FIG. 1 to FIG. 4 and FIG. 6 to FIG. 10, the fast and simple expansion bolt includes a cylindrical expansion bolt main body 1; and an expansion bolt locating line 9 is formed in an outer wall of a front end of the expansion bolt main body 1. The expansion bolt locating line is formed by forming three annular slots on an outer wall of a front part of the expansion bolt main body 1; and depths of the annular slots in a radial direction of the expansion bolt main body 1 gradually increase from back to front. A tail seat 2 is fixedly mounted at a rear end of the expansion bolt main body 1. The tail seat 2 is in a shape of a truncated cone having a diameter gradually decreasing from back to front. A minimum diameter of the tail seat 2 is not less than a diameter of the expansion bolt main body 1, and the tail seat 2 is coaxially connected to the expansion bolt main body 1. A pressing seat 6 is arranged inside a rear end of the tail seat 2. An expansion sliding hole running through from front to back is formed in the middle of the expansion bolt main body 1 and the middle of the pressing seat 6; the locating column 5 is mounted in the expansion sliding hole in a manner of sliding from front to back; and a truncated cone-shaped expansion head 15 with a diameter gradually increasing from back to front is arranged at a front end of the locating column 5. A locating slot 10 with an opening in a front end is formed in the expansion bolt main body 1 at the locating line 9. From FIG. 1, FIG. 2, and FIG. 3, it can be seen that there are four locating slots 10 which are elongated notches uniformly distributed in a circumferential direction of the expansion bolt main body 1 and arranged in a front-back direction. The locating slots 10 are communicated to the expansion sliding hole and an outer side of the expansion bolt main body 1 in the radial direction of the expansion bolt main body 1. The arrangement of the locating slots 10 is more conducive to the expansion head 15 entering the front end of the expansion bolt main body 1 under a force, which causes the front end of the expansion bolt main body 1 to expand outwards. A rear end portion of the locating column 5 on a rear side of the pressing seat 6 is hinged with a pressing handle 3 through an adjustment pin 4. The pressing handle 3 at the adjustment pin 4 is provided with a pressing cam 16 cooperating with the pressing seat 6. It can also be that a rear end portion of the locating column 5 is hinged, via an adjustment pin, with a pressing cam 16 cooperating with the pressing seat 6, and a pressing handle 3 is connected to the pressing cam 16. The pressing handle 3 is pulled to drive the pressing cam 16 to rotate around the adjustment pin. The pressing cam 16 can drive the locating column 5 to slide backwards relative to the pressing seat 6 and the expansion bolt main body 1.

Figure 6:
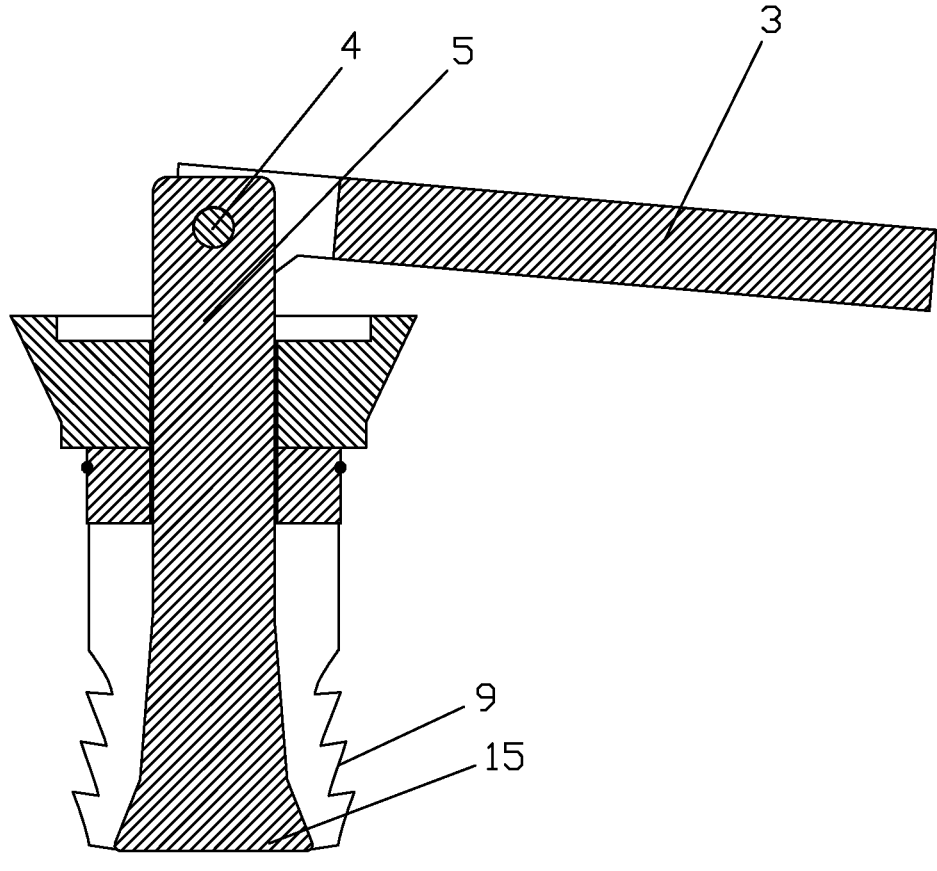
FIG. 6 is a cross-sectional view at A-A in FIG. 4.
Figure 7:
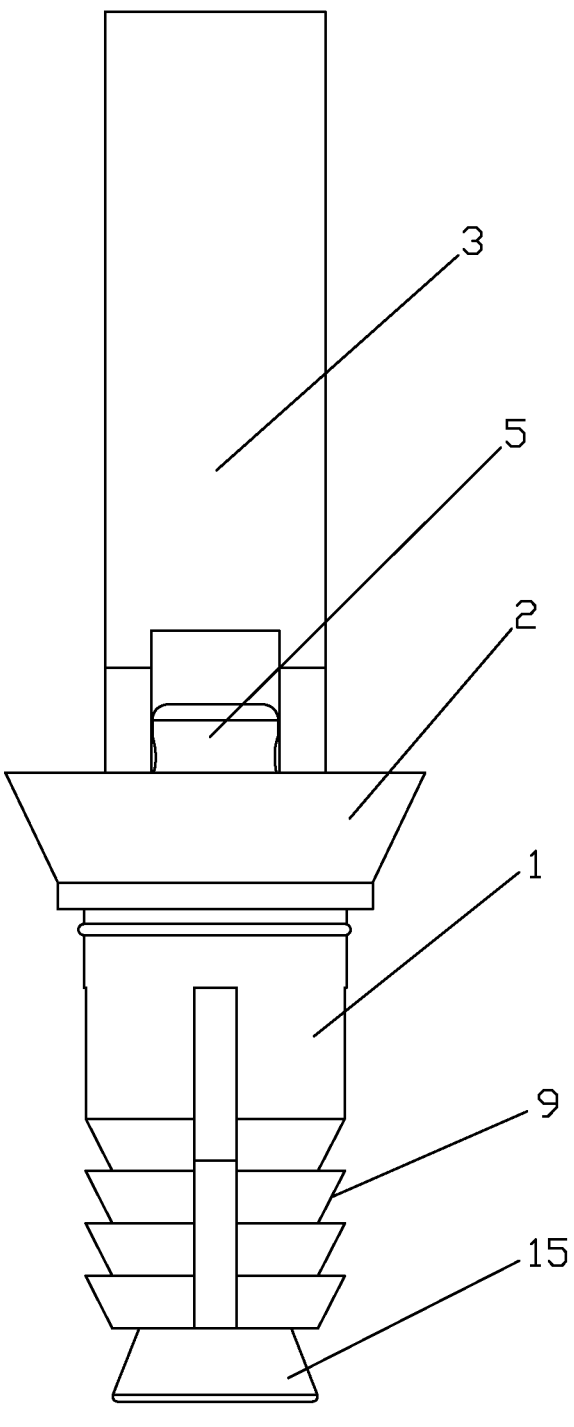
FIG. 7 is a schematic structural diagram illustrating that a small-diameter part of a pressing cam is in contact with a pressing seat in a fast and simple expansion bolt according to the present disclosure.
Figure 8:
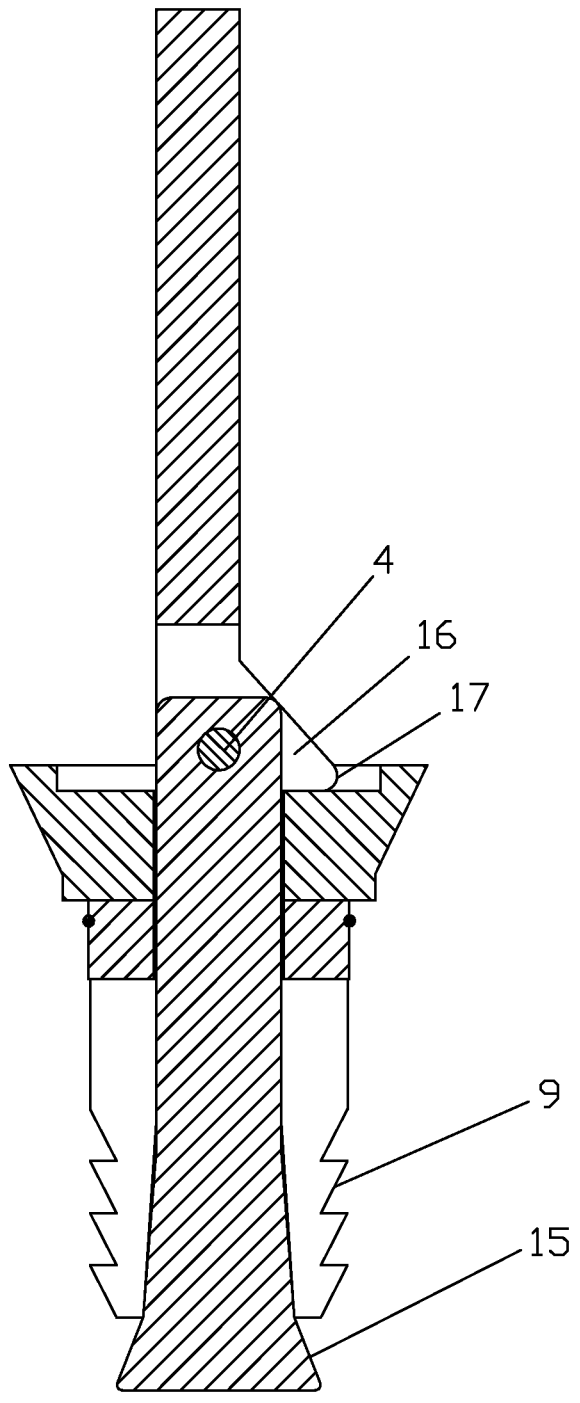
FIG. 8 is a cross-sectional view at B-B in FIG. 7.
Figure 9:
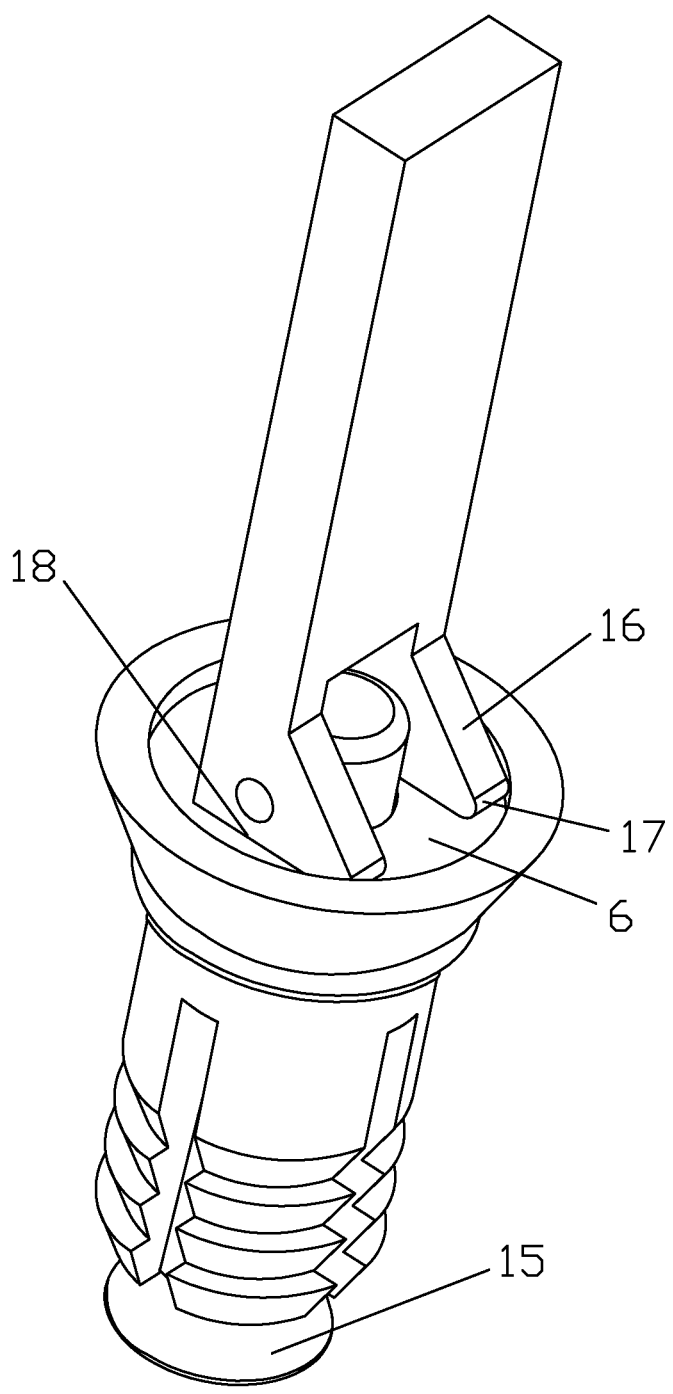
FIG. 9 is a schematic diagram of a three-dimensional structure of FIG. 7.

The pressing cam 16 is a disk-shaped cam. The pressing handle 3 can be pulled to drive the pressing cam 16 to rotate around the adjustment pin 4. A small-diameter part 18 of the pressing cam is adjusted to be in contact with the pressing seat 6 or a large-diameter part 17 of the pressing cam is adjusted to be in contact with the pressing seat 6. From FIG. 8, FIG. 9, and FIG. 10, it can be seen that the small-diameter part 18 of the pressing cam has a straight contour line, and the large-diameter part 17 of the pressing cam has an arc-shaped contour line. The small-diameter part 18 of the pressing cam and the large-diameter part 17 of the pressing cam are connected through a curved surface in a smooth transition manner. In this embodiment, the pressing cam 16 is driven by the pressing handle 3 to rotate clockwise or anticlockwise, so that the contact between the small-diameter part 18 of the pressing cam and the pressing seat 6 becomes the contact between the large-diameter part 17 and the pressing seat 6, or the contact between the large-diameter part 17 of the pressing cam 16 and the pressing seat 6 becomes the contact between the small-diameter part 18 of the pressing cam and the pressing seat 6. When the small-diameter part 18 of the pressing cam is in contact with a rear end surface of the pressing seat 6, the expansion head 15 is located on a front side of the expansion bolt main body 1. When the pressing cam 16 rotates until the large-diameter part 17 of the pressing cam is in contact with the pressing seat 6, the locating column 5 is pulled back until the expansion head 15 enters a front end portion of the expansion bolt main body 1, and the front end portion of the expansion bolt main body 1 expands outwards, an effect diagram of which is as shown in FIG. 6.

Figure 10:
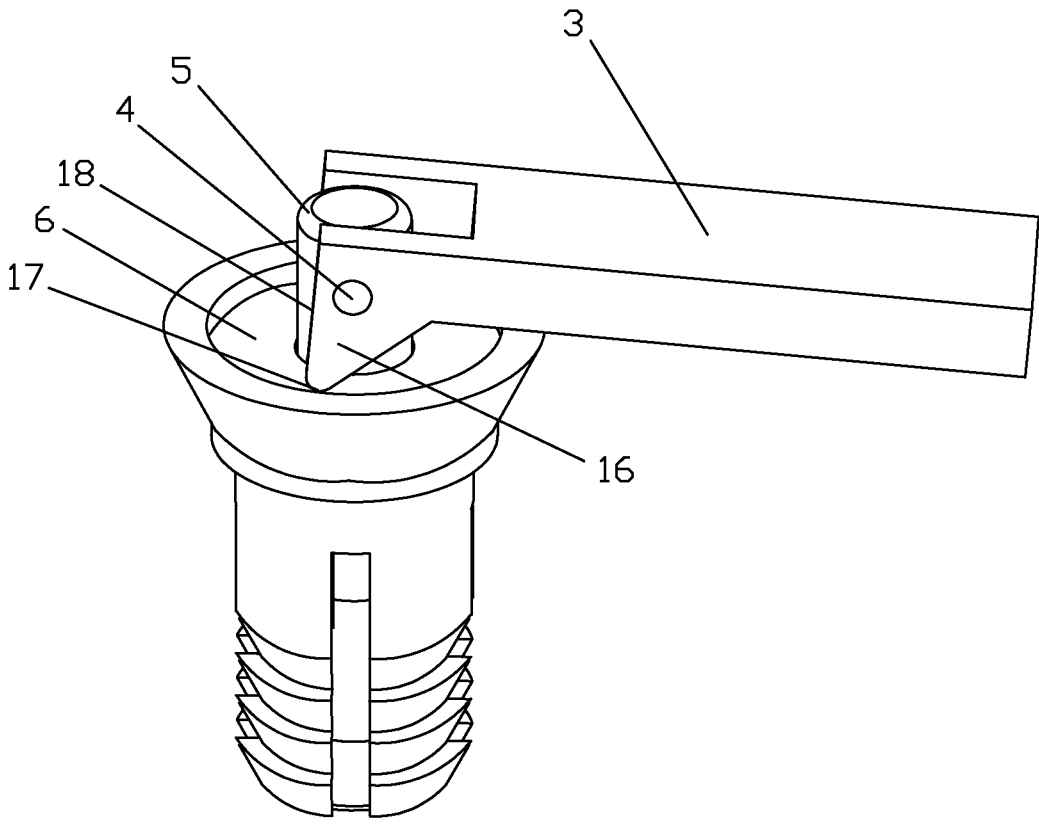
FIG. 10 is a schematic structural diagram illustrating that a large-diameter part of a pressing cam is in contact with a pressing seat in a fast and simple expansion bolt according to the present disclosure.

Further, when the expansion head 15 enters the front end portion of the expansion bolt main body 1 and the front end portion of the expansion bolt main body 1 expands outwards, the large-diameter part of the pressing cam and the pressing handle 3 are respectively located on a left side and a right side of the adjustment pin 4, a state structure of which is as shown in FIG. 10. Anticlockwise rotation of the pressing cam can be prevented, and the anticlockwise rotation is caused by a forward tension generated by the adjustment pin 4 on the pressing cam when the pressing handle 3 is not pulled.

Working principle: The present disclosure includes an expansion bolt main body 1, a tail seat 2, a pressing handle 3, an adjustment pin 4, a locating column 5, a pressing seat 6, a locating ring 7, a rubber ring 8, an expansion bolt locating line 9, a locating slot 10, a wear plate 11, an anticorrosion sheet 12, an antirust sheet 13, a metal fiber sheet 14, an expansion head 15, a pressing cam 16, a large-diameter part 17 of pressing cam, and a small-diameter part 18 of pressing cam. During use, a corresponding hole is punched in advance in an object or a workpiece to be fixed. Two locating workpieces to be fixed are aligned by connecting holes. The expansion bolt main body 1 is inserted into the connecting holes of the two locating workpieces to be fixed, and the tail seat 2 is located and pressed in the connecting hole of one locating workpiece to be fixed. The pressing handle 3 is pulled until the contact between the small-diameter part 18 of the pressing cam 16 and the pressing seat 6 becomes the contact between the large-diameter part 17 and the pressing seat 6. In this process, under an acting force of the pressing cam 16, the locating column 5 moves backwards relative to the expansion bolt main body 1. The expansion head 15 is pulled into the front end portion of the expansion bolt main body by the locating column 5, and the front end of the expansion bolt main body is compressed to expand by the expansion head 15 and is fixed in the connecting hole of the other locating workpiece to be fixed. In this way, an end portion of the pressing handle 3 is in contact with a surface of one locating workpiece to be fixed, and the large-diameter part 17 of the pressing cam and the pressing handle 3 are respectively located on the left side and the right side of the adjustment pin 4, a state structure of which is as shown in FIG. 10, so that the connection is more stable. The present disclosure can achieve the purpose of fast fixation with bare hands and has the advantages of improved working efficiency, fast removal, reusability, reduced cost, and the like.

What is claimed is:

1. A fast and simple expansion bolt, comprising: an expansion bolt main body, wherein an expansion bolt locating line is formed in an outer wall of a front end of the expansion bolt main body; a locating slot is formed in the expansion bolt locating line; a rubber ring is located on an outer wall of the expansion bolt main body; a tail seat and a locating ring are located and mounted at a rear end of the expansion bolt main body; a pressing seat is located inside the tail seat; a locating column is located radially within the pressing seat; a pressing handle is movably arranged on the locating column; and an adjustment pin is arranged between the pressing handle and the locating column;

wherein the expansion bolt main body is internally provided with a wear plate, an anticorrosion sheet, an antirust sheet, and a metal fiber sheet; the antirust sheet is located on a surface of the metal fiber sheet; the anticorrosion sheet is located on a surface of the antirust sheet; and the wear plate is located on a surface of the anticorrosion sheet.

2. The fast and simple expansion bolt according to claim 1, wherein the expansion bolt main body is integrally formed with the expansion bolt locating line, the locating slot, the locating ring, and the tail seat through casting.

3. The fast and simple expansion bolt according to claim 1, wherein the pressing handle and the locating column move with each other through the adjustment pin; and the pressing handle drives the expansion bolt main body to be pressed downwards and located.

4. The fast and simple expansion bolt according to claim 1, wherein the expansion bolt main body and the rubber ring are sealed and located through glue.

5. The fast and simple expansion bolt according to claim 1, wherein the wear plate, the anticorrosion sheet, the antirust sheet, and the metal fiber sheet are integrally formed through casting.

6. The fast and simple expansion bolt according to claim 1, wherein the expansion bolt main body is cylindrical; the expansion bolt locating line is formed by forming at least two annular slots on the outer wall of a front part of the expansion bolt main body; and radial depths of the annular slots gradually increase from back to front.

7. The fast and simple expansion bolt according to claim 1, wherein an expansion sliding hole running through from front to back is formed in a middle of the expansion bolt main body and a middle of the pressing seat; the locating column is mounted in the expansion sliding hole in a manner of sliding from front to back; and a truncated cone-shaped expansion head with a diameter gradually increasing from back to front is arranged at a front end of the locating column.

8. The fast and simple expansion bolt according to claim 1, wherein the locating slot is an elongated notch arranged in a front-back direction of the expansion bolt main body and having an opening in the front end; and the locating slot is communicated to the expansion sliding hole and an outer side of the expansion bolt main body in a radial direction of the expansion bolt main body.

9. The fast and simple expansion bolt according to claim 1, wherein the tail seat is in a truncated cone shape having a diameter gradually decreasing from back to front.

10. The fast and simple expansion bolt according to claim 1, wherein the pressing handle is hinged with the locating column via the adjustment pin; and a pressing cam cooperating with the pressing seat is arranged on the pressing handle at the adjustment pin.

*     *     *     *     *